Feb. 21, 1967   A. T. VOLONAKIS   3,305,683
INDEXING MECHANISM FOR IRRADIATING PACKAGES
Filed April 3, 1964   3 Sheets-Sheet 1

INVENTOR.
ANGELO T. VOLONAKIS
BY

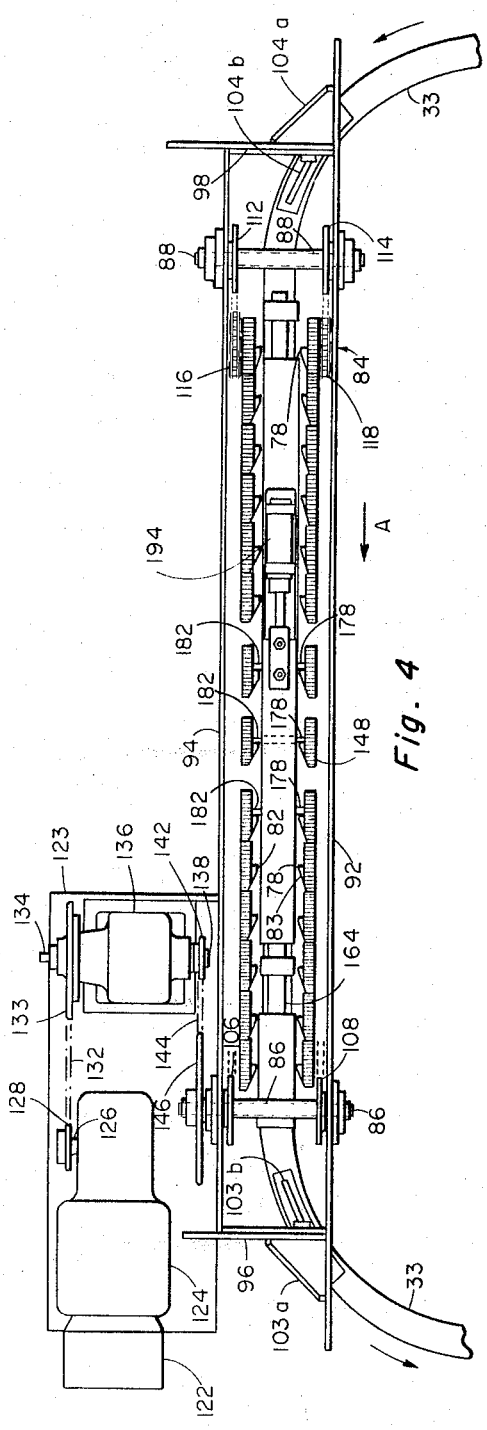

United States Patent Office 3,305,683
Patented Feb. 21, 1967

3,305,683
INDEXING MECHANISM FOR
IRRADIATING PACKAGES
Angelo T. Volonakis, Emerson, N.J., assignor to the United States of America as represented by the United States Atomic Energy Commission
Filed Apr. 3, 1964, Ser. No. 357,341
5 Claims. (Cl. 250—52)

The invention described herein was made in the course of, or under a contract with the U.S. Atomic Energy Commission.

The present invention relates to an indexing mechanism and more particularly to an indexing mechanism for positioning successively a series of packages for exposure to radiation.

Recent developments in the art of food preservation have been in the so-called pasteurization of foodstuffs by the application of doses of radiation at levels below that of complete sterilization. The pasteurization doses of radiation avoid, in the cases of many types of food, such as fresh fish, detectable alterations of texture, color and flavor and permit the refrigerated shelf-life of the perishable products to be extended substantially.

One of the problems encountered in the design of equipment to effect this radiation pasteurization is the control of dosage so as to treat each successive package with an equal dose and further to apply doses within a very narrow range of intensities. An arrangement designed for the radiation pasteurization of fish products and other perishable foodstuffs appears in U.S. Patent No. 3,192,054. The arrangement described in the aforementioned patent provides for the indexing of packages across a pit in which gamma ray sources are stored and from which they are advanced cyclically to irradiate the food packages. While the arrangement as therein described results in the radiation pasteurization of the food contained within the packages carried along a conveyor system, a greater degree of control over the dosages applied will produce greater economies and more uniform results which will permit guarantees of longer shelf life than heretofore has been possible.

The present invention provides for a more accurate and uniform control over radiation dosage application than has so far been possible. As in the arrangement described in the previously mentioned patent application, the food packages are carried along in a conveyor system and are indexed across a pit in which radiation sources are located. The packages are intermittently moved and halted in spaced positions and the sources are raised to be inserted into the mentioned spaces. In accordance with this invention, however, a unique indexing mechanism is provided to move the packages across the opening and locate them with respect to the radiation sources with a greater degree of accuracy than has heretofore been obtained. In addition, adjustments in spacing are accomplished readily and with a minimum of difficulty to accommodate changes in package size and changes in the number of radiation sources which are utilized.

It is thus a first object of this invention to provide an arrangement for exposing a series of packages in succession to uniform doses of radiation.

Another object of this invention is to provide apparatus for indexing packages of uniform size and shape in successive order past an energy source to obtain uniform applications of energy.

Still another object is the provision of an arrangement for conveying packages in a predetermined spatial relationship.

Other objects and advantages of this invention will hereinafter become obvious from the following description of a preferred embodiment of this invention made with reference to the accompanying drawings in which:

FIG. 1 shows somewhat schematically the overall arrangement of the irradiation system to which this invention has particular application;

FIGS. 2a, 2b, 2c, and 2d show the irradiation sources and food packages arranged to demonstrate the sequence of operations carried out by a preferred embodiment of this invention;

FIG. 3 is a side elevation view of a preferred embodiment of this invention;

FIG. 4 is a top view of the apparatus of FIG. 3;

FIG. 6 is a top view of the index bar.

Figure 1:
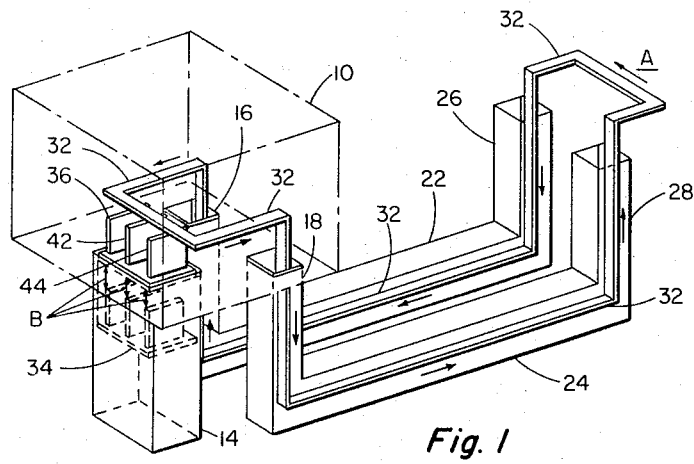

Referring to FIG. 1, there are shown a room 10 in phantom, a source elevator shaft or storage pit 14, and conveyor passageways consisting of shafts 16, 18, tunnels 22, 24, and shafts 26, 28. Packages 30, as seen in FIGS. 2a–d, containing food to be irradiated, follow a path 32 which may be used to carry packages 30 from the load-unload area A, down through shaft 26, tunnel 22, up shaft 16, and over pit 14, where irradiation takes place. Packages 30 are returned to area A through vertical shaft 18, horizontal tunnel 24, and vertical shaft 28.

Within pit 14, elevator 34 supports in this case three irradiation plaques 36 in spaced, upright positions as illustrated. Elevator 34 is normally movable as shown by arrows B between the positions illustrated. In the upper position of elevator 34, plaques 36 are located between adjacent packages 30 for irradiating the latter. When in the lower position (shown in phantom), plaques 36 are retracted to permit movement of packages 30 across pit 14. The bottom of elevator shaft or pit 14 is filled with water into which elevator 34 is retracted when the irradiation cell is not being used. The bottom of pit 14 would contain sufficient water to cover plaques 36.

Each of plaques 36 in the particular embodiment described is a gamma radiation source which may consist of a sheet of cobalt-60 sandwiched between stainless steel sheets forming a cladding, as is understood in the art. The cobalt metal when irradiated in a reactor would be nickel-plated and encapsulated in aluminum for activation. The construction of source plaques 36 does not form a part of this invention.

Figure 2A:
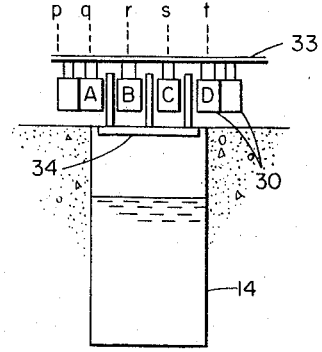

Packages 30 are conveyed suspended from an overhead conveyor system along path 32 directly over source pit 14. Food packages 30 are subject in turn to carefully controlled dosages of gamma irradiation to effect the "pasteurization" of the contents. In FIGS. 2a, 2b, 2c and 2d, it will be seen that packages 30 are suspended from a conveyor monorail 33 located along path 32 and moved along in the direction indicated by the arrows in FIGS. 2b and 2c. In FIG. 2a, elevator 34 is in its upper position with plaques 36 extending spaced packages 30A, 30B, 30C and 30D, which are in stop positions, q, r, s and t, respectively, for irradiating same. Package 30A is held in stop position q waiting for its turn to be indexed across elevator shaft 14.

Figure 2B:
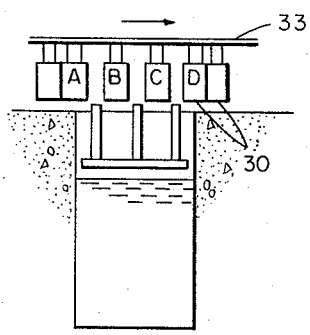
Figure 2C:
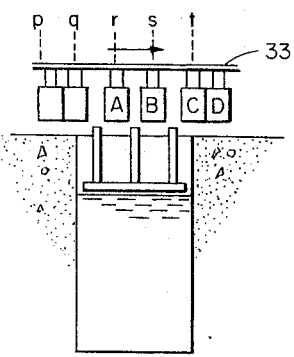
Figure 2D:
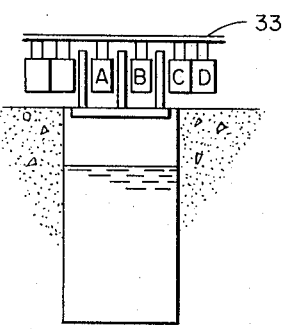

In FIG. 2b, this period of irradiation is completed and elevator 34 is moved down to permit the packages to be indexed in the direction shown in FIG. 2c, that is, each package moved across to the next stop position. In FIG. 2d, elevator 34 is up again in its irradiation position.

Figure 5:
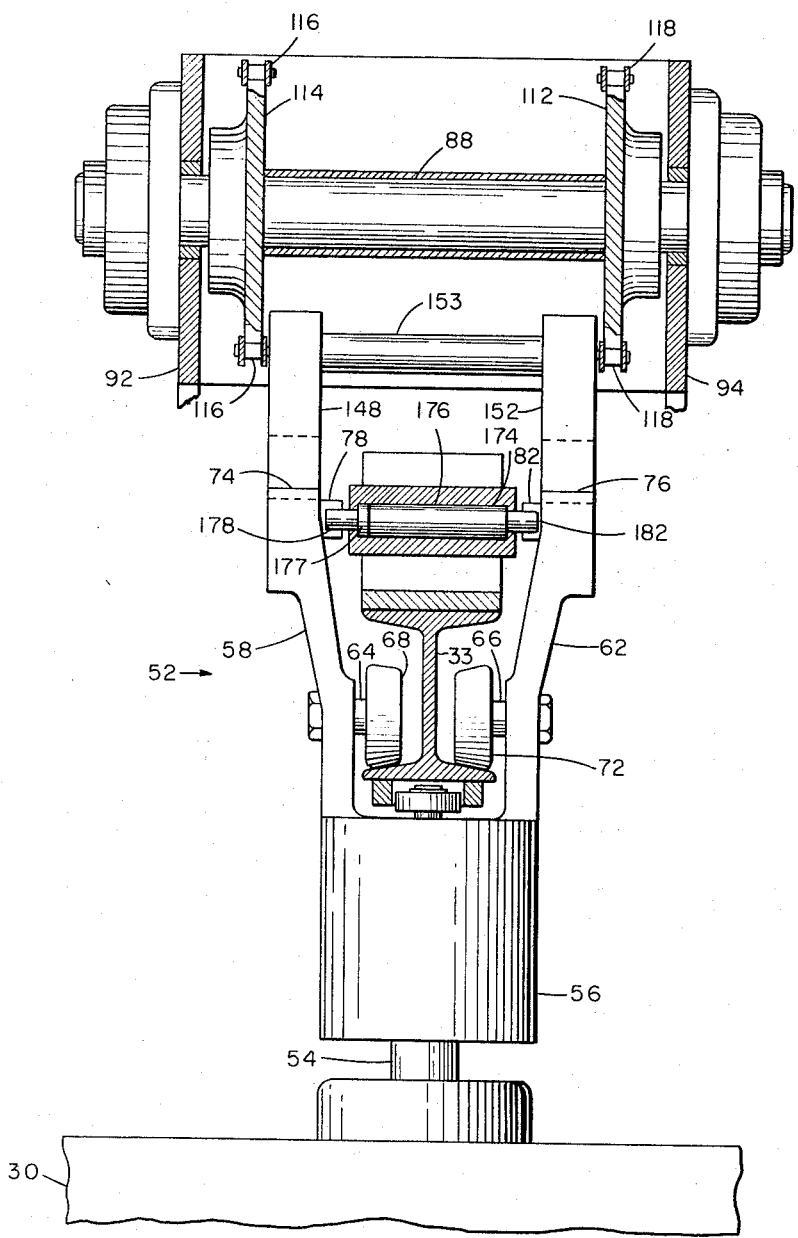
FIG. 5 is a view along 5—5 in FIG. 3.

For a description of the apparatus in accordance with this invention to index packages 30 across shaft 14, reference is made to FIGS. 3, 4 and 5. Monorail 33 consists of an I-beam defining the path traveled by packages 30. As is understood in the art and not forming a part of this invention, a removable section of I-beam 33 is located in each of the vertical shafts 16, 18, 26 and 28, and elevators (not shown) are used to transport the movable sections with packages supported from one elevation to another. Each of the packages 30 is attached to a carrier 52 by way of a convenient coupling 54. As shown particularly in FIG. 5, each carrier 52 consists of a cylindrical body 56 and a pair of upper extending wings 58 and 62. The intermediate portion of wings 58 and 62 carry rotatable shafts 64 and 66 which support suitably shaped and mounted wheels 68 and 72 riding along the lower inside portion of beam 33. Wheels 68 and 72 thereby support carrier 52 to permit the latter to roll freely along I-beam 33. The upper edges 74 and 76 of wings 58 and 62 are provided with serrations as best shown in FIG. 3. Immediately below upper edges 74 and 76, facing inwardly, are a pair of identical but oppositely facing teeth 78 and 82. Tooth 78 has a sloped surface 83 facing in the direction of carrier movement. Tooth 82 is similarly constructed.

Mounted above monorail 33 is a chain drive system 84 which consists of a pair of rotatable shafts 86 and 88 supported by a pair of structural steel or other suitable plates or walls 92 and 94. Plates 92 and 94 are held together to form a rigid structure by a pair of cross members 96 and 98. Plate 92 has a pair of legs 102 and 103 and cross members 96 and 98 rest on monorail 33 to support the chain drive system 84. Additional support and rigidity is provided by members 103a and 103b against plate 96 and members 104a and 104b attached to plate 98.

Mounted and keyed on shaft 86 between plates 92 and 94 are a pair of pulley chain drive wheels 106 and 108. On the other shaft 88 are mounted and keyed a pair of idler chain pulley wheels 112 and 114. A closed loop chain 116 is mounted over pulley wheels 106 and 112 while a similar chain 118 is mounted over pulley wheels 108 and 114. The drive for the pulley system just described originates from an electric motor 122 located on a plate 123 connected to a reduction transmission 124 with the output on a shaft 126 having a pulley wheel 128 keyed thereto. Pulley wheel 128 is connected by way of a chain 132 to a pulley wheel 133 mounted on and keyed to a shaft 134 connected into an electrically actuated single revolution intermittent drive unit 136 of conventional design. The output of drive unit 136 is by way of a shaft 138, pulley wheel 142, and a chain 144 to a pulley wheel 146 mounted on and keyed to shaft 86 previously described. Thus, motor 122 provides the drive for shaft 86. While motor 122 is rotating continuously, drive unit 136, when actuated, will rotate shaft 86 only a predetermined number of degrees and then automatically de-clutch shafts 134 and 138 so that in effect chains 116 and 118 will move only a predetermined distance each time drive unit 136 is actuated, for a purpose to be later described.

Mounted on chains 116 and 118 in the manner shown are a plurality of identical pawls 148 and 152, respectively, as best seen in FIG. 5, having, in the case of pawls 148, teeth 154 to engage the serrations on the top edges of wings 58. Pawls 148 and 152 are suspended from chains 116 and 118 by way of a shaft 153 pinned at opposite ends to said chains. Thus it is seen that movement of chains 116 and 118 will cause pawls 148 and 152, and hence carriers 52 to be moved or advanced in the direction of arrow A a predetermined distance during the interval of time that drive unit 136 is actuated. As seen from FIG. 3, pawls 148 on chain 116 (and likewise pawls 152 on chain 118) are spaced apart such that each carrier 52 is engaged by one when stacked up as illustrated in FIG. 3 in the positions indicated by legends a, b, c, d, e and f. As a result of this arrangement, all carriers in the positions designated a through n are engaged by a pawl 148 and a pawl 152.

Mounted on monorail 33 in the manner illustrated and extending between pawls 148 and 152 is an index bar 156 which is shaped as shown in greater detail in FIG. 6. Bar 156 consists of a rectangular cross section end portion 158 and an intermediate rectangular cross section portion 162. Portions 158 and 162 are connected by a cylindrical section 164 and the opposite end of bar 156 has a similar cylindrical portion 166. A generally rectangular opening 168 extending from top to bottom is located as shown in FIG. 6 in the intermediate portion of bar 156 and is illustrated cut away in FIG. 3. Rectangular portions 158 and 162 are provided with a plurality of spaced transverse openings 172 to accommodate spring loaded pin assemblies 174, as seen in FIG. 5. Each pin assembly 174 consists of a hollow main cylindrical body 176 with an end plate 177 from which protrude at opposite ends a pair of pins 178 and 182. A spring (not shown) within body 176 biases pins 178 and 182 outwardly. As will best be seen in FIG. 4, pins 178 and 182 engage with the transverse surfaces of teeth 78 and 82 when index bar 156 is moving in the direction of arrow A and with this will drive selected carriers 52 in the same direction.

As best seen in FIG. 3, index bar 156 is supported on monorail 33 by several brackets and arms 183, 184, 186, 188 and 192 to permit axial movement of bar 156 in either direction. A pneumatic power piston and cylinder device 194 is mounted likewise on monorail 33 in the opening 168 of index bar 156. A rod 196 and an adapter 198 attach bar 156 to the pneumatic device 194. While not illustrated, device 194 is provided with the usual lines to supply high pressure air for its actuation. Device 194 has a predetermined stroke, and when actuated will move bar 156 in the direction indicated by arrow A the distance of the stroke. When actuated again, bar 156 will be returned to its initial or standby position. A typical stroke, by way of example, would be 2½".

In the operation of the apparatus described, each carrier 52 supports a package 30 which can contain a large number of food packages to be irradiated. The carriers 52 are free running on their wheels 68 and 72 along monorail 33. Conventional conveyor apparatus (not illustrated) would be used to move carriers along monorail 33 up to a position within 2½ inches of position a shown in FIG. 3 at which point the indexing mechanism of this invention assumes control. For example, a free running chain drive (not shown) with push arms which are spring clutched can be used to move carriers along monorail 33 and automatically operated elevators well known in the art may be used to transfer the carriers 52 from one level to another in vertical shafts 16, 18, 26 and 28. Under any system selected, however, carriers 52 are delivered to position a and removed from position n in FIG. 3.

Referring to FIGS. 3 and 4 it will be remembered that motor 122 is rotating continuously at a fixed speed of rotation so that there is a continuous input by way of shaft 134 to drive unit 136. When irradiation source slabs 36, 42 and 44 are retracted into storage pit 14 and it is desired to move the packages in positions a through n in the direction of arrow A ahead by one position (the width of one carrier), drive unit 136 would be actuated to pass the drive out through shaft 138 for a given number of degrees of rotation. This will cause chains 116 and 118 to be moved a fixed distance equal to the spacing packages in positions a and b lined up against each other. At this point pins 178 and 182 have ridden over the slanted portions of teeth 78 and 82 and are positioned to push when actuator 194 is energized. Thus, pawls 148 and 152 will move the carrier in position a to position b, the carrier in position b to position c, and so down the complete line of packages. After pawls 148 and 152 stop their movement, it will be seen that the carriers located above storage pit 14 will not be properly spaced for the insertion of the irradiation slabs. That is, the carrier which should be in position g actually is located somewhere between positions f and g and similarly with regard to the carriers which should be in positions h and i.

At this point, air motor 194 is actuated by releasing air under pressurer to one side of its piston. This will cause index bar 156 to move in the direction of arrow A. In this arrangement, index bar 156 would be provided with a total of five pin assemblies 176 including three in the slab area. One pin assembly 176 is located to engage carrier 52 in position n, and another to engage a carrier 52 located before position a. As shown best in FIG. 4, pins 178 and 182 are now located against the transverse surfaces of the teeth on the carriers which were in positions f, g and h but had been moved forward the width of a carrier 52. Index bar 156 will move its full stroke which is the exact distance required to position the aforementioned carriers into positions g, h, and i, respectively. At the same time the carrier in position n will be pushed away from its neighbor in position m so that a pusher (not shown) may grab it and take it away. In addition, the carrier 52 located before position a will be pushed into position a. Index bar 156 is then retracted coming to rest at its beginning position for the next forward cycle. The return trip of index bar 156 would be initiated by manually closing a switch or a conventional microswitch actuated at the end of the index bar stroke to reverse the actuation of index bar 156. The source slabs can then be raised into the spaces between packages 30 located in positions f, g, h and i and then lowered after a predetermined period of time. When pawls 148 and 152 are moved in the next cycle, it will be seen that pins 178 and 182 will slide easily over the angled surfaces of teeth 78 and 82 so that when carriers 52 come to rest these pins will be in a position to move selected carriers 52 into location as before. In the cycle just described, the operation can be observed visually and an operator can sequentially initiate each step, or, if preferred, and as is completely understood in the art a series of microswitches and stop limits can be used to automate the whole system.

It should be noted that different spacings of packages 30 can be easily arranged by changing the locations of the pins in index bar 156 and by altering the number of degrees of shaft rotation delivered by intermittent drive unit 136. Different sized food packages can be accommodated by adjusting the number of degrees drive unit 136 will operate to move pawls 148 and 152 forward. Thus the arrangement is highly flexible in permitting changes in the number of slabs which can be used at once, the total amount of exposure applied, and the sizes of packages accommodated.

It is thus seen that there has been described an arrangement for automatically indexing packages in and out of position for the controlled application of penetrating radiation for the radiation pasteurization of food.

While only a preferred embodiment of this invention has been described it is understood that the scope of the invention is to be defined only by the appended claims.

I claim:
1. Apparatus for the application of selected doses of penetrating radiation to a series of packages comprising
   (a) at least one source of said radiation;
   (b) means including carriers conveying said packages through a zone of radiation, including means for cyclically moving said packages in a row forming a pause between each forward movement;
   (c) means for pushing some of said packages immediately following each forward movement into selected positions with at least one predetermined space between adjacent packages to receive said source; and
   (d) means for cyclically thrusting said source into said space for a finite interval of time to expose the adjacent packages to the selected dose of radiation and then withdrawing said source to permit another cycle of package movement and pushing in the forward direction thereby to expose successive packages to said doses of radiation.

2. The apparatus as set forth in claim 1 in which said moving means consists of pawls driven by chains to engage said carriers, motor means to drive said chains, and clutch means to engage said motor means to said chain for movement of said carriers for a predetermined distance.

3. The apparatus of claim 2 in which said clutch means is adjustable to permit said predetermined distance to be varied to accommodate changes in package size.

4. The apparatus of claim 2 in which said pushing means includes an index bar having spring load pins to engage said carriers during a forward stroke to position said carriers in the preselected positions, said index bar having means to permit the change of location of each said pin to change the selected position of each carrier engaged.

5. The apparatus as set forth in claim 4 in which said index bar is provided with a pneumatically operated motor of predetermined stroke connected directly to said index bar for driving the latter.

References Cited by the Examiner

UNITED STATES PATENTS 3,142,759  7/1964  Jefferson _____ 250—52
3,224,562  12/1965  Bailey et al. _____ 250—52

RALPH G. NILSON, *Primary Examiner.*

A. L. BIRCH, *Assistant Examiner.*